United States Patent
Thompson

[19]
[11] Patent Number: 6,042,447
[45] Date of Patent: Mar. 28, 2000

[54] HAND OPERATED ANIMAL CALL

[76] Inventor: Donald L. Thompson, 101 NE. 109th Ter., Kansas City, Mo. 64155

[21] Appl. No.: 09/008,150

[22] Filed: Jan. 16, 1998

[51] Int. Cl.[7] .................................................. A63H 5/00
[52] U.S. Cl. ........................... 446/193; 446/188; 446/208
[58] Field of Search .............................. 446/26, 180, 188, 446/197, 207, 208, 213, 183, 184, 193

[56] References Cited

U.S. PATENT DOCUMENTS

| | | | |
|---|---|---|---|
| 2,583,400 | 1/1952 | Wade | 446/208 |
| 3,777,310 | 12/1973 | Yang | 2/48 |
| 4,223,636 | 9/1980 | Dishong | 119/29 |
| 4,850,925 | 7/1989 | Ady . | |
| 5,462,473 | 10/1995 | Sheller | 446/183 |
| 5,577,946 | 11/1996 | Oathout . | |
| 5,613,891 | 3/1997 | Lamo | 446/26 |
| 5,704,154 | 1/1998 | Galfidi, Jr. | 42/90 |

FOREIGN PATENT DOCUMENTS

| | | | |
|---|---|---|---|
| 573250 | 6/1924 | France | 446/207 |
| 9249 | of 1893 | United Kingdom | 446/209 |

*Primary Examiner*—Kien T. Nguyen
*Assistant Examiner*—Laura Fossum
*Attorney, Agent, or Firm*—Litman, Kraai & Brown L.L.C.

[57] ABSTRACT

A hand operated animal call includes a vibrating reed sound generator positioned to vibrate within a hollow reed housing. The reed housing is positioned within an air impervious pouch which has a restricted opening. An elongate sound modifying tube is attached to the reed housing and protrudes through the restricted opening in the pouch. The pouch is filled with a porous, compressible fiber with an elastic memory. When the pouch is manually squeezed, air is forced through the reed housing, thus vibrating the reed, which, in turn, causes the reed housing and elongate sound modifying tube to vibrate as well to simulate a deer or buck mating call.

10 Claims, 6 Drawing Sheets

HAND OPERATED ANIMAL CALL

BACKGROUND OF THE INVENTION

I. Field of the Invention

The present invention relates to hand operated animal calls, and, more particularly, to such a call which incorporates a vibrating housing with a vibrating reed therein. The vibrating reed housing is contained within a substantially air impervious pouch and an elongate tube is attached to an air outlet of the vibrating reed housing and protrudes out of an opening in the air pouch. The pouch is preferably filled with a porous, compressible fiber with an elastic memory. Manual squeezing of the air pouch compresses the fiber, forcing air from the pouch through the reed housing, thus vibrating the reed, the reed housing and the elongate tube, creating a sound resembling a buck's rutting sound. Release of the air pouch allows the fiber to rebound to its original shape, thus causing the pouch to expand and draw air back in through the elongate reed and reed housing.

II. Description of the Related Art

Figure 13:
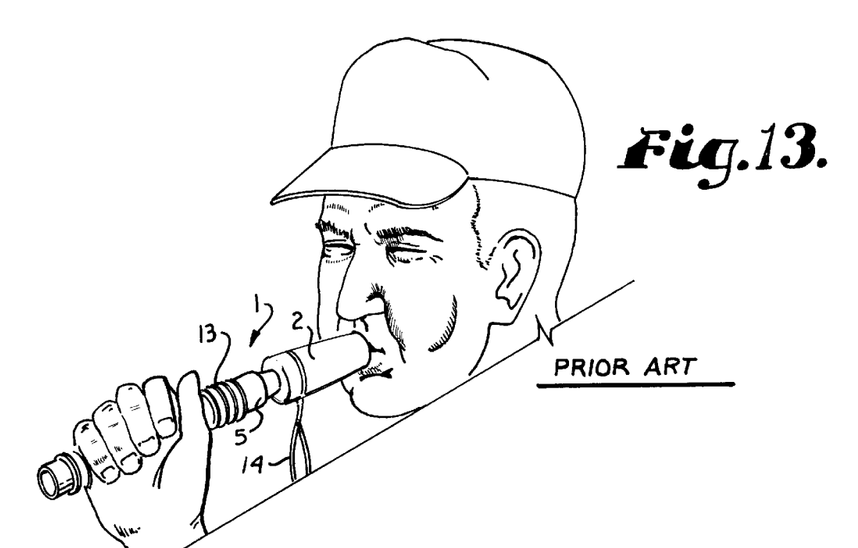
FIG. 13 is a perspective view of a prior art mouth operated animal call being used by a hunter.
Figure 14:
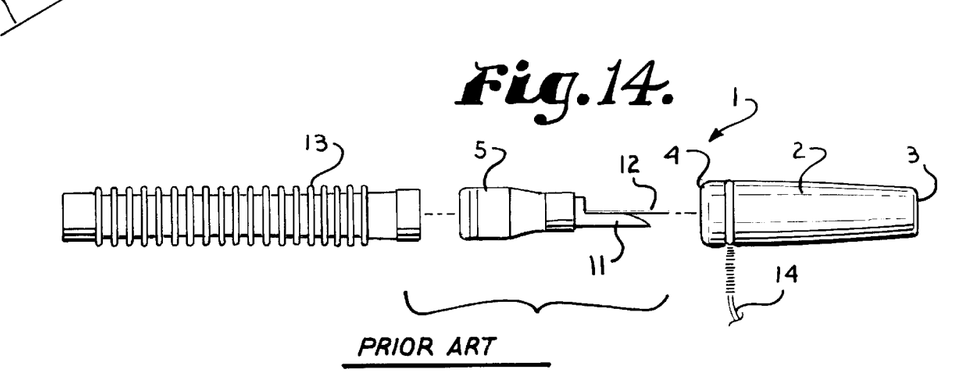
FIG. 14 is an enlarged, side elevational, exploded view of the prior art mouth operated animal call of FIG. 13.

Deer hunting in recent years has become very popular as deer populations have increased greatly in most states. Traditionally, deer hunting season occurs during the fall rutting season for the animals since this is the time of year when they are most active and easiest to find. It is the goal of most deer hunters to bag a "trophy" buck, i.e. one with a large rack of antlers which can function as a trophy. During the rutting season, bucks employ various mating calls to attract interested does and warning sounds to establish their territory. These are known as rutting sounds. Does also, to a lesser degree, use mating calls, which are somewhat higher pitched than those of rutting bucks. In an effort to attract bucks to their position, hunters have long employed "calls" which make sounds mimicking the rutting sounds of bucks and/or mating calls of does. Typically these have been mouth calls which require a hunter to place the intake end of a mouthpiece against their lips and blow through a vibrating reed device positioned therein. Often an exhaust end of the mouthpiece is attached to an elongate tube which acts as a damper, modifying the sound from the mouthpiece in an attempt to resemble a deer's rutting sound. Typically the vibrating reed will be somewhat longer (i.e. a lower frequency vibrator) for a buck call and somewhat shorter (higher frequency) for a doe call. Some calls are designed such that the effective vibrating length of the reed can be modified by positioning elastic bands or the like at different points along the length of the reed to modify the output frequency so that a single call can be used for both bucks and does. Such a prior art mouth call is illustrated in FIGS. 13 and 14 herein.

Although mouth calls can be very effective when used correctly, they have a number of shortcomings. Mouth calls take a certain amount of skill and experience to use properly since the user must blow the call with the correct amount of lung pressure for the correct length of time to create the desired sound and sound intensity. Typically these mouth calls are hung around the neck of a hunter via a sling, which can cause problems. If worn on the outside of a hunter's outer garment, the call will bounce around and can become snagged on fences, underbrush, etc. If the call is worn under the outermost garment, access to it when needed becomes problematical. The fairly involved physical steps required to access the mouth call and bring it up to his lips can make the hunter visible to the quarry, often spooking the deer instead of attracting it. During extremely cold weather conditions, moisture in a hunter's breath can freeze inside the mouth call, thus changing the frequency of the call or preventing the reed from vibrating at all. Finally, use of a mouth call entirely occupies at least one of a hunter's hands, which means that, after use of the call, the hunter must drop the call, reach for, grab and lift their weapon into firing position, all without calling attention to their position.

It is clear then, that a need exists for a hand operated animal call. Such a call should be easy to use for a novice hunter, should be readily and quickly accessible when needed and should be economical, yet durable.

SUMMARY OF THE INVENTION

The present invention is a hand operated animal call which includes a vibrating reed sound generator positioned within a hollow reed housing. The reed housing is open at an inlet end and is partially closed at an exit end with a baffle formed in the partially closed end and with the baffle including a radiused slot sized to receive a thin vibrating reed positioned proximate a tapered reed retainer. The exit end of the reed housing is sized to mate with an inlet end of a corrugated, elongate sound modifying tube. The reed housing and an inner portion of the elongate tube is positioned within an air impervious pouch which has a restricted opening. An outer portion of the elongate tube protrudes through the restricted opening in the pouch and a retaining ring snugly encircles the pouch opening and the elongate tube. The pouch is preferably filled with a porous, compressible fiber with an elastic memory. When the pouch is manually squeezed, air is forced through the reed housing, thus vibrating the reed, which, in turn, causes the reed housing and elongate sound modifying tube to vibrate as well. If the pouch is squeezed several times in rapid succession, the sound effect generated is that of a rutting sound of a buck. By skilled manipulation of the elongate sound modifying tube, i.e. squeezing the tube at appropriate points, the effective vibrating length of the sound modifying tube can be altered, thus changing the frequency of the generated sound to that of a doe's mating call. The air impervious pouch can be placed inside of a somewhat larger exterior pouch which can be similarly shaped with a similar restricted opening. The exterior pouch can be constructed of a rugged camouflage material and can include a loop for attaching the animal call to a user's belt or the like. Alternatively, the pouches can be combined with a single pouch having an air impervious inner layer and a camouflage exterior appearance.

PRINCIPAL OBJECTS AND ADVANTAGES OF THE INVENTION

The principal objects and advantages of the present invention include: providing an improved hand operated animal call; providing such a call which is easily usable by even a novice hunter; providing such a call which can be used in place of prior art mouth operated animal calls; providing such a call which includes an air impervious pouch which, when squeezed, forces air through a reed housing and elongate sound modifying tube to simulate the sound so an animal, particularly a deer; providing such a call which is advantageous in that it can be easily carried by attachment to a user's clothing, etc. and which can be operated while in the attached position; providing such a call which can be easily operated by a hunter with minimal movement and even while holding a weapon in a firing position; and providing such a call which is efficient and reliable, economical to manufacture and which is particularly well suited to its intended purpose.

Other principal objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "front", "rear", "right" and "left" will refer to directions in the drawings to which reference is made.

PRIOR ART MOUTH OPERATED ANIMAL CALL

Referring to the drawings in more detail, FIGS. 13 and 14 illustrate a prior art mouth operated call designed to simulate a rutting call of a male deer or buck, which mouth call is generally indicated at 1. The mouth call 1 includes an essentially tubular mouth piece 2 with an air inlet end 3 and an air exit end 4. The mouth piece 2 connects, at the air exit end 4, with a reed retaining housing 5. The reed retaining housing 5 includes a tapered extension 11 which supports a thin vibrating reed 12 within the mouth piece 2. An elongate, corrugated sound modifying tube 13 is attachable to the reed retaining housing 5 with the entire, assembled mouth call 1 being supported around a user's neck by a cord 14. As shown in FIG. 13, the cord 14 is preferably of sufficient length that the user can raise the mouth call 1 to an operating position without removing the cord 14 from his neck.

INVENTIVE HAND OPERATED ANIMAL CALL

Referring to FIGS. 1–10, a hand operated animal call in accordance with the present invention is illustrated, and generally indicated at 21. The hand call 21 includes a hollow reed housing 22 which is open at an inlet end 23 and is partially closed at an exit end 24. A baffle 25 is formed in the partially closed exit end 24, with the baffle including a radiused slot 31 sized to receive a thin vibrating reed 32 positioned proximate and held in place by a radiused, tapered reed retainer 33. The external diameter of the exit end 24 of the reed housing 22 is sized to mate with an inlet end 35 of a corrugated, elongate sound modifying tube 36. The tube 35 includes a pair of flexible rings 37 which are sized to snap fit over respective rings 38 around the red housing 22.

Figures 1, 2:
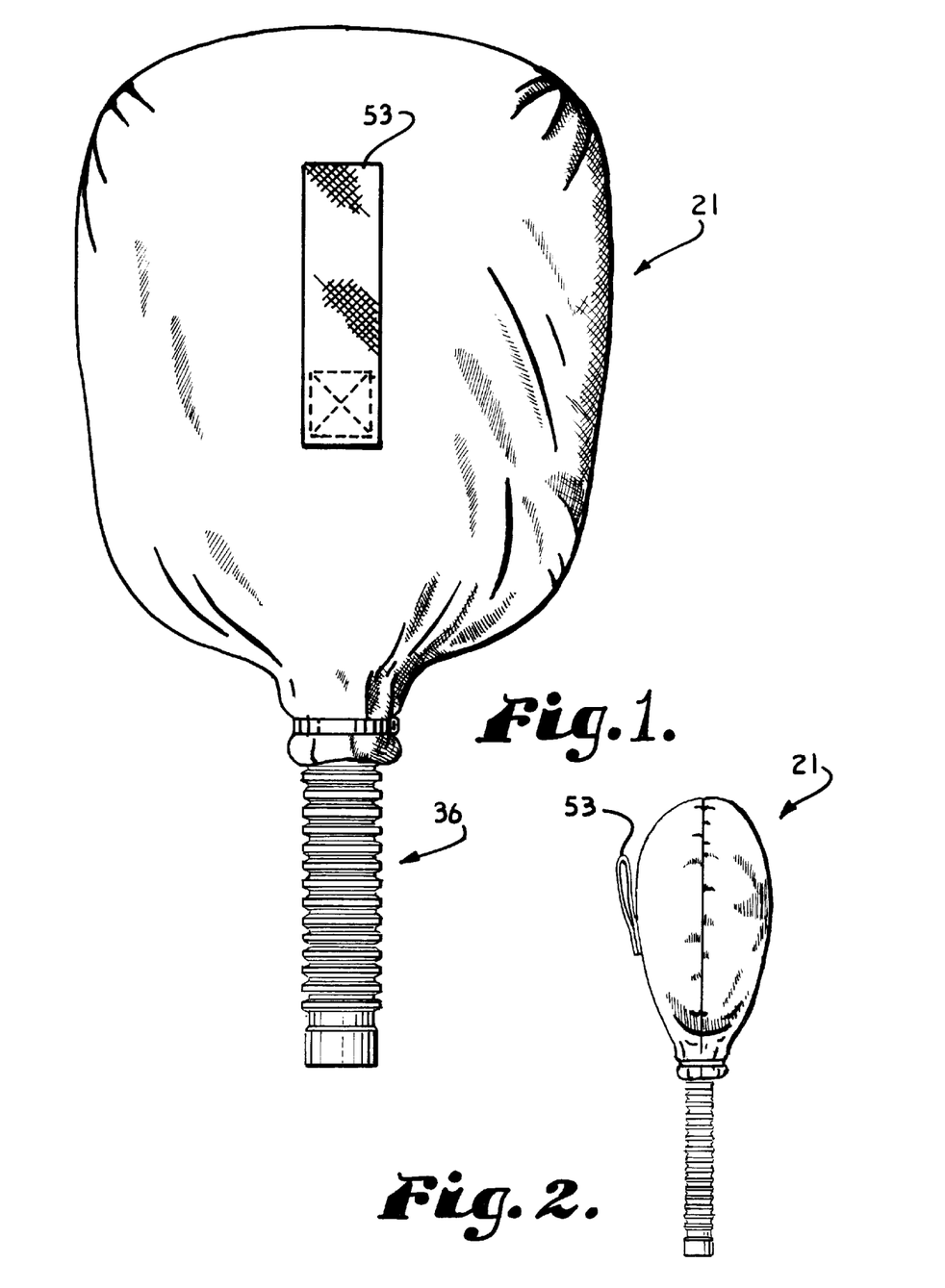
FIG. 1 is a front elevational view of a hand operated animal call in accordance with the present invention.
FIG. 2 is a reduced, side elevational view of a the inventive hand operated animal call.
Figure 3:
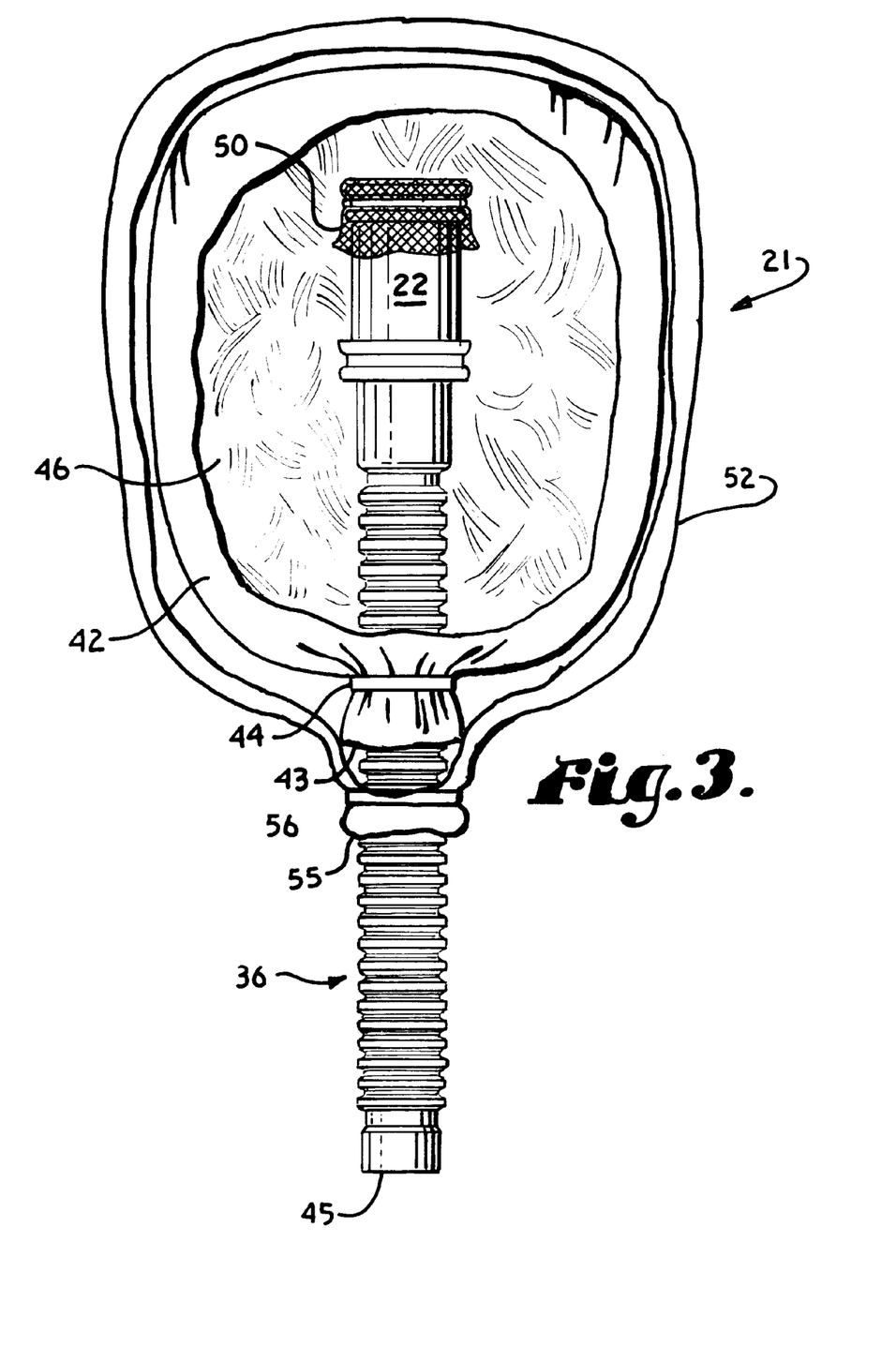
FIG. 3 is another front elevational view of the inventive hand operated animal call, with portions of an outer pouch and an inner pouch broken away to illustrate the interior construction.
Figure 4:
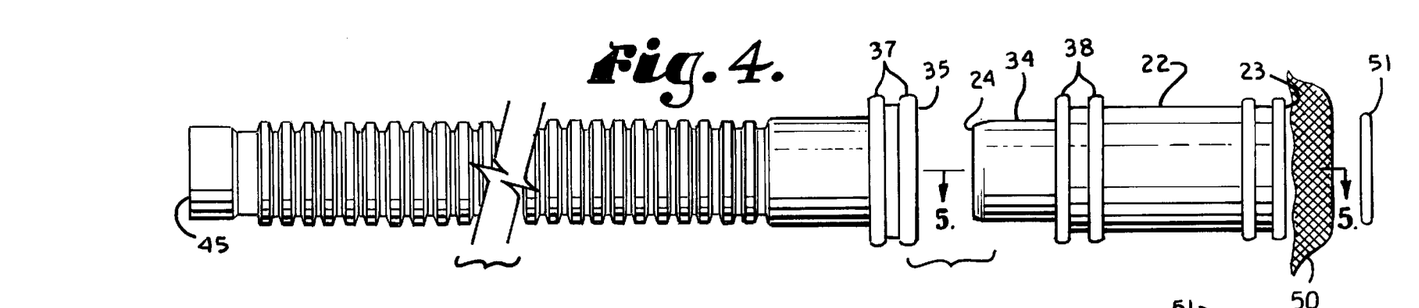
FIG. 4 is a greatly enlarged, exploded view of the reed housing and elongate sound modifying tube of the inventive animal call.
Figure 5:
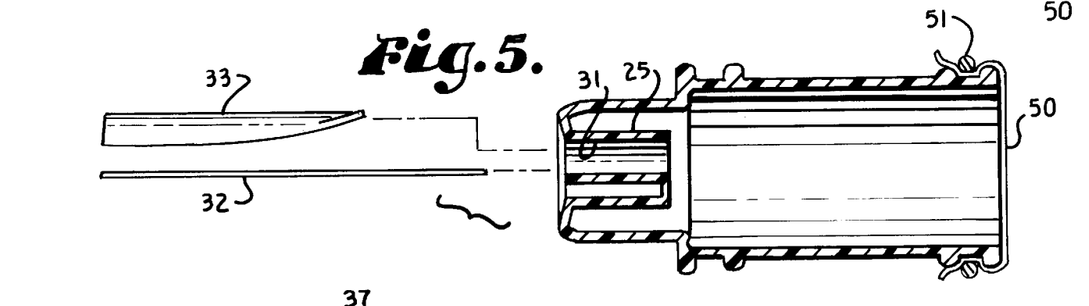
FIG. 5 is a greatly enlarged, cross-sectional view of the reed housing, taken along line 5—5 of FIG. 4, with a tapered reed retainer and vibrating reed shown separately.
Figure 6:
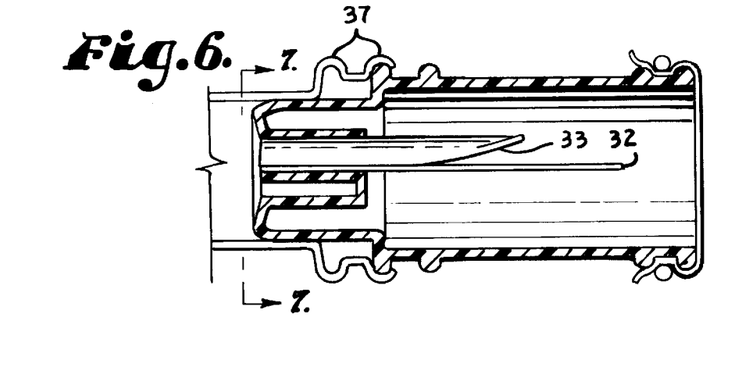
FIG. 6 is a greatly enlarged, cross-sectional view of the reed housing, again taken along line 5—5 of FIG. 4, with the tapered reed retainer and vibrating reed inserted therein.
Figure 7:
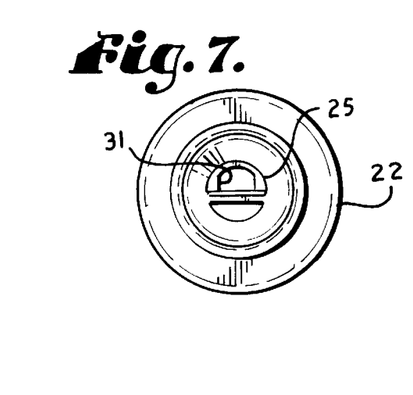
FIG. 7 is an end elevational view of the reed housing, taken along line 7—7 of FIG. 6.
Figure 8:
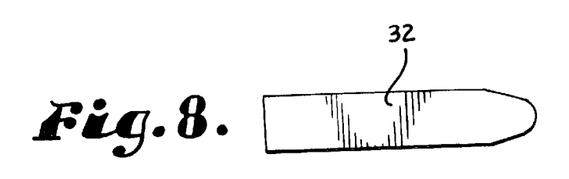
FIG. 8 is a greatly enlarged top plan view of the vibrating reed.
Figure 9:
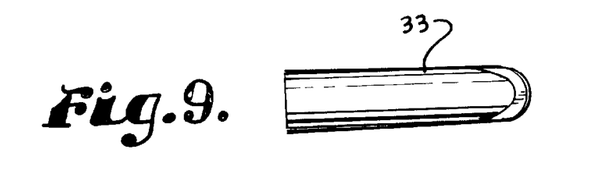
FIG. 9 is a greatly enlarged bottom plan view of the tapered reed retainer.
Figure 10:
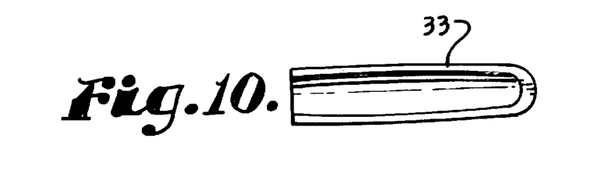
FIG. 10 is a greatly enlarged top plan view of the tapered reed retainer.

The reed housing 22 and a first portion of the elongate tube 36 are positioned within a substantially air impervious pouch 42 which tapers inward to form a restricted opening 43. A second portion of the elongate tube 36 protrudes through the restricted opening 43 in the pouch 42 and a retaining ring 44 snugly encircles the pouch opening 43 and the elongate tube 36 to retain the tube 36 in place. The elongate tube 36 has an open exit opening 45.

The pouch 42 is filled with a porous, compressible fiber 46 with an elastic memory. A screen 50 positioned over the inlet end 23 of the reed housing 22 and is held in position via an elastic band 51. The air impervious pouch 42 acts as a source of compressed air, i.e. an air diaphragm, a function performed by a user's lungs in prior art mouth calls such as the call 1.

Figure 12:
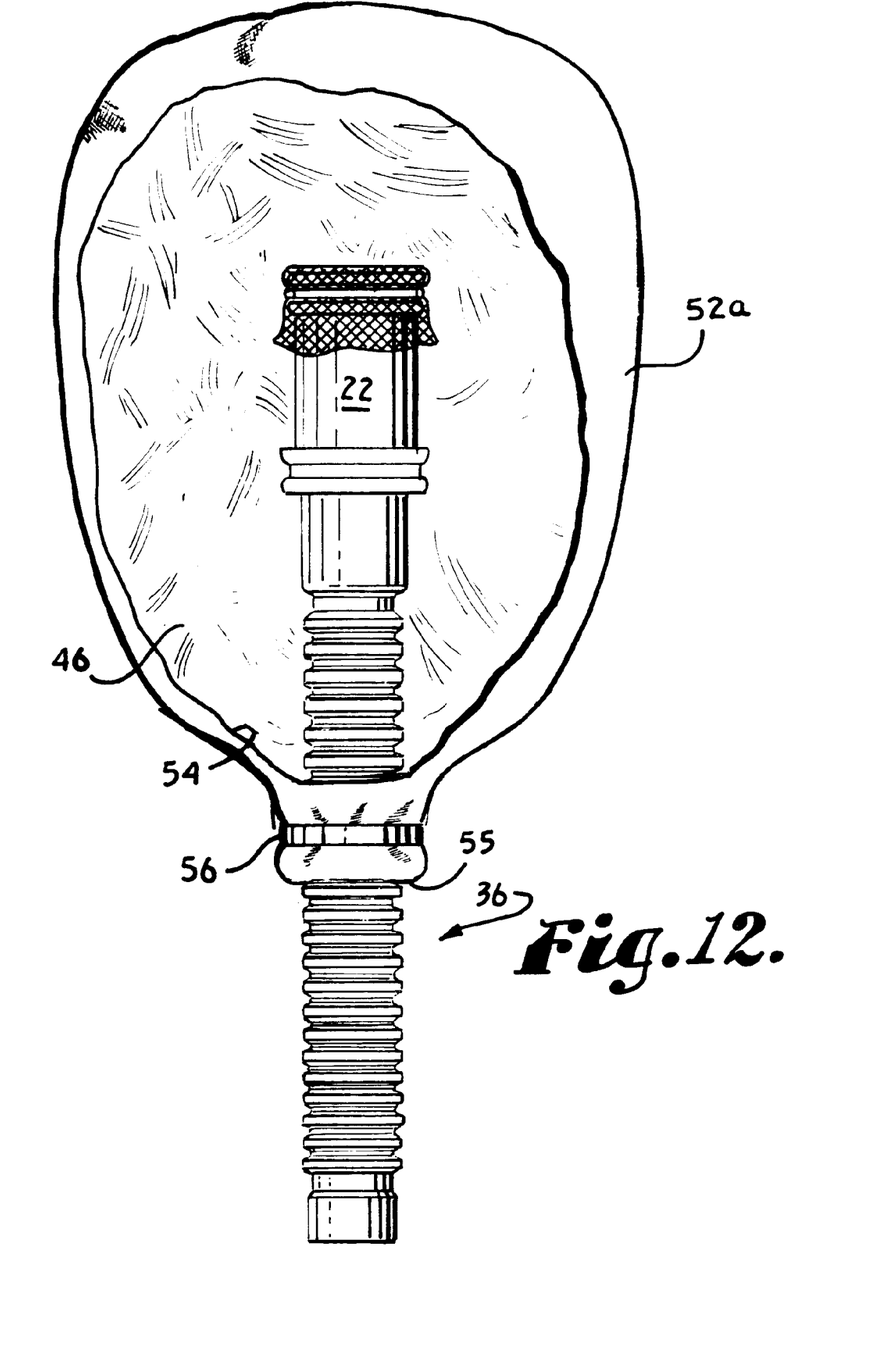
FIG. 12 is a front elevational view of a second modified embodiment of hand operated animal call with a single air impervious pouch replacing the double pouch of FIGS. 1–3.

The pouch 42 is shown as an inner pouch positioned within a slightly larger outer pouch 52 of the same general shape. The outer pouch 52 preferably is made from a rugged camouflage material, such as denim or the like, and includes a loop 53 sewn therein so that a user can wear the hand operated call 21 on his belt or any other suitable outer clothing band or snap. As an alternative, as shown in FIG. 12, the inner pouch 42 can be eliminated and a single pouch 52a can be made of or lined with an air impervious material or liner 54, such as neoprene, such that the pouch 52a serves as both a protective cover and as an air diaphragm. Both the outer pouch 51 and the combined pouch 52a have tapered openings 55 which are snugly fit about the elongate tube 36 via a retaining ring 56.

In operation, when the pouches 52 and 42 (or 52a) are manually squeezed, air is forced through the reed housing 22, thus vibrating the reed 32 against the tapered reed retainer 23, which, in turn, causes the reed housing 22 and elongate sound modifying tube 36 to vibrate as well. If the pouches 52 and 42 are squeezed several times in rapid succession, the sound effect generated is that of a rutting sound of a buck. By skilled manipulation of the elongate sound modifying tube 36, i.e. grasping and slightly squeezing the tube 36 at appropriate points, the effective vibrating length of the sound modifying tube 36 can be shortened, thus raising the frequency of the generated sound so that the call simulates a doe's mating call. Alternatively, by cupping a user's hands around the exit opening 45 of the tube 36, the effective frequency of the call 21 can be lowered, causing the creation of a lower frequency sound.

In a preferred embodiment of the invention, the following materials and sizes were used. The vibrating reed housing 22, vibrating reed 32, the reed retainer 23 and elongate sound modifying tube 36 were all made of molded polystyrene plastic. Dimensions of the various components were as follows:

The vibrating reed housing 22 was 2.30 inches in overall length, had a wall thickness of 0.040 inches, an outer diameter of the exit end of 0.75 inches, an inner diameter at the entrance end of 0.835 inches and an outer diameter at the entrance end of 0.915 inches and a radius of the radiused slot 31 of 0.183 inches.

The vibrating reed 32 was 1.938 inches in overall length, had a material thickness of 0.009 inch and a width of 0.375 inches.

The reed retainer 23 had an overall length of 1.75 inches and a radius of 0.175 inches.

The sound modifying tube 36 was 8 inches in overall length, extending 7.5 inches past the vibrating reed housing 22, had a material thickness of 0.035 inches and a maximum outer diameter (at the corrugations) of 0.735 inches and a minimum outer diameter (between the corrugations) of 0.600.

The pouch 42 and 52a were constructed of 1/16 inch neoprene rubber and the pouches 52 and 52a preferably had a camouflage pattern on the exterior surface thereof.

Figure 11:
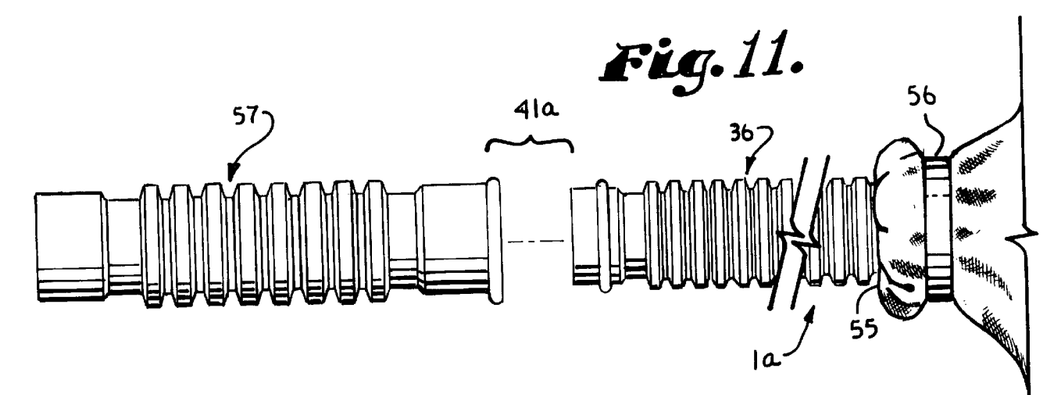
FIG. 11 is a greatly enlarged, fragmentary view of a portion of a first modified embodiment of hand operated animal call with an elongate sound modifying tube provided in two portions such that the call can be easily modified to make different frequency sounds.

FIG. 11 illustrates a slightly modified version of the inventive hand operated animal call, generally indicated at 1a. The modified call 1a includes an elongate sound modifying tube 36a which includes two separable portions 57 and 58. The tube portion 57, when used, alone, is sized to modify the call 1a to vibrate at a frequency which simulates a doe's mating call. The tube portion 58, when it is attached to the tube portion 57, causes the call 1a to vibrate at a lower frequency, thus simulating a buck's rutting call.

Various changes to the invention will occur to those skill in the art. For example, the large air impervious bag 42 (or 52a) can be replaced by a small rubber bulb similar to those found on bicycle horns. The size and position of the loop 53 can be changed a number of ways or replaced with a snap, a key chain ring, a hook and loop fastener or any other suitable type of retention member. The retaining rings 44 and 56 can take the form of a gear clamp, plastic ratchet clamp, stout elastic band or any other type of encircling, restrictive member. While the pouches 42 and 52a have been illustrated as containing the porous fiber 46, the hand operated call 21 will function adequately without the fiber 46, particularly if the pouch 42 or 52a is made of a fairly heavy duty fabric with an inherent elastic memory.

Furthermore, the sound modifying tube 36 can also be eliminated and the vibrating reed housing 22 modified to produce the desired frequency sound without it and made longer such that an air exit end protrudes out of the pouch.

It is thus to be understood that while certain forms of the present invention have been illustrated and described herein, it is not to be limited to the specific forms or arrangement of parts described and shown.

I claim:

1. A hand operated animal call, comprising:

a. a flexible, substantially air impervious pouch, said pouch including an opening;

b. a vibrating reed housing positioned entirely within said air impervious pouch, said housing having an air inlet opening and an air outlet opening;

c. a vibrating reed positioned within said reed housing, said vibrating reed oscillating at a predetermined rate due to air being forced through said reed housing from said air inlet opening to said air outlet opening;

d. a sound modifying tube attached to said air outlet opening of said reed housing within said pouch, a portion of said sound modifying tube extending out of said pouch opening; and e. a quantity of porous, compressible fiber positioned in said pouch surrounding said vibrating reed housing, said compressible fiber having an elastic memory such that it is reduced in volume when the pouch is compressed and expands in volume once the pouch is released.

2. A hand operated animal call as in claim 1, and further comprising:

a. securing means for securing said pouch opening about said sound modifying tube.

3. A hand operated animal call as in claim 1, wherein said pouch is an inner pouch, and further comprising:

a. an outer pouch substantially surrounding said inner pouch.

4. A hand operated animal call as in claim 3, and further comprising:

a. a loop attached to an exterior of said outer pouch.

5. A hand operated animal call as in claim 1, and further comprising:

a. a mesh screen positioned to cover the inlet opening of said vibrating reed housing.

6. A hand operated animal call as in claim 1, and further comprising:

a. a loop attached to an exterior of said pouch.

7. A hand operated animal call, comprising:

a. a flexible, substantially air impervious pouch, said pouch including an opening;

b. a vibrating reed housing positioned entirely within said air impervious pouch, said housing having an air inlet opening and an air outlet opening;

c. a vibrating reed positioned within said reed housing, said vibrating reed oscillating at a predetermined rate due to air being forced through said reed housing from said air inlet opening to said air outlet opening;

d. a sound modifying tube attached to said air outlet opening within said pouch, a portion of said sound modifying tube extending out of said pouch opening;

e. securing means for securing said pouch opening about said sound modifying tube; and f. a quantity of porous, compressible fiber positioned in said pouch surrounding said vibrating reed housing, said compressible fiber having an elastic memory such that it is reduced in volume when the pouch is compressed and expands in volume once the pouch is released.

8. A hand operated animal call as in claim 7, wherein said sound modifying tube is of a two part construction such that one part can be removed to change the effective length of the sound modifying tube.

9. A hand operated animal call as in claim 7, and further comprising:

a. a loop attached to an exterior of said pouch.

10. A hand operated animal call as in claim 7, and further comprising:

a. a mesh screen positioned to cover the inlet opening of said vibrating reed housing.

* * * * *